United States Patent [19]
Voght et al.

[11] Patent Number: 5,867,206
[45] Date of Patent: *Feb. 2, 1999

[54] CATV FREQUENCY SWEEP TESTING USING RF TRANSMITTER TO GENERATE TEST SIGNALS

[75] Inventors: Timothy R. Voght, Indianapolis; Daniel K. Chappell, Fishers, both of Ind.

[73] Assignee: Wavetek Corporation, Indianapolis, Ind.

[ * ] Notice: The term of this patent shall not extend beyond the expiration date of Pat. No. 5,585,842.

[21] Appl. No.: 693,018

[22] Filed: Aug. 6, 1996

Related U.S. Application Data

[63] Continuation of Ser. No. 308,452, Sep. 19, 1994, Pat. No. 5,585,842.

[51] Int. Cl.$^6$ .............................. H04N 7/16; H04N 17/00
[52] U.S. Cl. ................... 348/6; 348/12; 348/192; 455/3.1
[58] Field of Search .................. 348/6, 12, 13, 348/192, 193; 455/3.1, 6.1, 6.2, 6.3; H04N 7/10, 7/16, 7/173, 17/00, 17/04

[56] References Cited

U.S. PATENT DOCUMENTS

| | | | |
|---|---|---|---|
| 3,651,403 | 3/1972 | Fluck, Jr. ............................ | 455/4.1 |
| 4,408,227 | 10/1983 | Bradley ............................... | 348/192 |
| 4,439,784 | 3/1984 | Furukawa et al. ................... | 358/86 |
| 4,530,008 | 7/1985 | McVoy ................................ | 358/123 |
| 4,558,358 | 12/1985 | Onda ................................... | 358/86 |
| 4,648,123 | 3/1987 | Schrock .............................. | 455/67 |
| 4,700,222 | 10/1987 | Large et al. ........................ | 348/192 |
| 4,710,969 | 12/1987 | Fluck, Jr. et al. ................. | 455/67.3 |
| 4,733,223 | 3/1988 | Gilbert ............................... | 340/505 |
| 5,073,822 | 12/1991 | Gumm et al. ...................... | 358/139 |
| 5,231,494 | 7/1993 | Wachob ............................. | 358/146 |
| 5,233,418 | 8/1993 | Gumm et al. .................... | 455/3.1 X |
| 5,345,504 | 9/1994 | West, Jr. ............................. | 380/7 |
| 5,473,361 | 12/1995 | Penney ............................... | 348/6 |
| 5,585,842 | 12/1996 | Chappell et al. .................. | 348/192 |

OTHER PUBLICATIONS

Archer S. Taylor, Characterization of Cable TV Networks as the Transmission Media for Data, Mar., 1985, pp. 255–265.

Gary Chan, Reflection Perceptibility Threshold on NTSC Signals and its Measurement Technique in a CATV System, Nov., 1989, pp. 917–929.

*Primary Examiner*—Chris Grant
*Attorney, Agent, or Firm*—Maginot, Addison & Moore

[57] ABSTRACT

A method, system and apparatus for frequency sweeping and frequency sweep testing a CATV system wherein the CATV system has a plurality of channels and is transmitting television signals over at least some of the channels. The system includes a head end test unit coupled to the CATV system at its head end and a remote test unit coupled to the CATV system at a location remote from the head end. The head end test unit sweeps the CATV system by either generating and transmitting test signals at the channel frequencies over the CATV system or, if a television signal is being transmitted on a channel, using the television signal as the test signal. The head end test also measures the signal levels of the test signals and at the end of the sweep, transmits telemetry signals, which include the frequencies to be swept and the measured signal levels, over the CATV system to the remote test unit using the same transmitter that it used to generate and transmit the test signals. The remote test unit receives the information transmitted by the head end test unit and sweeps the same frequencies simultaneously with the head end test unit. During the sweep, the remote test unit measures the signal levels of the test signals and television signal test signals. After receiving the next set of telemetry signals, the remote test unit uses the information regarding the signal levels measured by the head end test unit and the signal levels it measured to determine the frequency response of the CATV system.

21 Claims, 5 Drawing Sheets

CATV FREQUENCY SWEEP TESTING USING RF TRANSMITTER TO GENERATE TEST SIGNALS

CROSS-REFERENCE TO RELATED APPLICATIONS

This application is a continuation of prior, co-pending application Ser. No. 08/308,452, filed Sep. 19, 1994, now U.S. Pat. No. 5,585,842.

BACKGROUND OF THE INVENTION

This invention relates to a method and system for testing cable (CATV) systems, and more particularly, to a method and system for a frequency sweep test instrument for testing the frequency response of a CATV system.

Cable televisions systems, often called CATV systems, have many miles of coaxial cable strung throughout their service area with amplifiers and other elements interspersed throughout. The CATV system has a number of channels over which are transmitted television signals. Each channel has a unique frequency. The subscribers to the CATV system are connected to the coaxial cable system.

To ensure the quality of the signals being transmitted over the coaxial cable system, the coaxial cable system must be periodically checked. Also, as is the case with any system having the complexity of cable systems, cable systems suffer periodic problems and failures. Often, such problems and failures results from the failure or degradation of an individual component of the cable system, such as an amplifier, and only a portion of the cable system is affected. When this happens, the individual component causing the problem must be located so that it can be repaired or replaced.

One way in which coaxial cable systems are checked is by testing their frequency response over the various channels. Heretofore, this has been accomplished by injecting a signal into the cable system at its front end and measuring the signal level at locations remote from the head end. Since cable systems have the capacity for carrying several channels and the frequency response of the coaxial cable may vary with frequency, it is necessary to check the cable system by measuring its frequency response for each channel that can be carried by the cable system. This is accomplished by sweeping the channels that can be carried by the coaxial cable system by sequentially injecting a signal into the cable system at each channel frequency at the cable systems' head end and measuring the signal level of each test signal at the remote location or locations.

To frequency sweep test a cable system, two pieces of test equipment are typically used, a head end test unit and a remote test unit. The head end test unit is connected to the cable system at its head end. The remote test unit is connected to the coaxial cable at a desired location remote from the head end. The head end unit runs the test by sending telemetry signals to the remote test unit followed by the frequency sweep test signals. The telemetry signals sync the remote test unit to the head end test unit and both units then sweep the cable system, the head end unit injecting test signals at each frequency and the remote unit measuring signal strength. At the end of the sweep, the head end test unit then again sends telemetry signals to the remote test unit. In addition to syncing the remote test unit to the head end test unit for the next sweep, the telemetry signals also contain information indicating the frequencies to be swept, and the voltage level at which the test signals will be injected. The remote test unit receives these results and based on its own measurements and the injection level indicated in the telemetry message, determines the frequency response of the cable system. The remote test unit typically displays this frequency response.

A problem with this heretofore used frequency sweep testing technique is that it disrupts service to the subscribers. When the sweep is being performed, the test signal being injected at each channel by the head end test unit will interfere with the subscriber's reception of that channel. Although this interruption is brief, it nevertheless causes a noticeable interruption in the subscriber's reception of that channel. Moreover, when conducting the frequency sweep test, the cable system is usually swept several times.

The head end test unit heretofore used have required two transmitter sections. One transmitter section is used to generate and transmit the telemetry signals to the remote test unit and the other transmitter section is used to generate and transmit the test signals.

It is an object of this invention to provide a frequency sweep test method and system that eliminates the need to disrupt service when conducting the sweep test.

It is also an object of this invention to reduce the cost and complexity of the head end test unit by replacing the two transmitters in the head end test unit with one.

SUMMARY OF THE INVENTION

In accordance with this invention, a method, and apparatus for frequency sweeping a CATV system having a plurality of channels is provided. Each channel of the CATV system has a unique frequency and the CATV system transmits television signals over at least some of the channels. The method and apparatus includes a RF transmitter for generating test signals at a plurality of the unique channel frequencies and transmitting the test signals over the CATV system during a sweep cycle. A controller coupled to the RF transmitter has a memory in which is stored a list of the channel frequencies to be swept. The controller indexes through the list of channel frequencies during the sweep cycle and determines for each channel frequency in the list whether a television signal is being transmitted on that channel frequency, causes the RF transmitter to generate and transmit a test signal at each such channel frequency if a television signal is not being transmitted on that channel, and causes the RF transmitter not to transmit a test signal at those channel frequencies for the channels on which television signals are being transmitted wherein the television signals are used as test signals on those channels on which the television signals are being transmitted. The apparatus also includes a RF receiver for receiving during the sweep cycle the plurality of test signals and the television signal test signals being transmitted over the CATV system wherein the signal levels of the test signals and television signal test signals are measured and input into the controller and stored in the controller's memory as is data indicative of the frequency of each measured signal. During a telemetry cycle, the controller outputs the stored data indicative of the measured signal levels and data indicative of the frequencies of the measured signals to the same RF transmitter which generates the test signals. The RF transmitter generates telemetry signals from the outputted data and transmits the telemetry signals over the CATV system.

In a method and system for frequency sweep testing a CATV system according to the invention, the above described apparatus comprises a head end test unit coupled to the CATV system at its head end. The system further includes a remote test unit which is coupled to the CATV system at a location remote from the head end of the CATV system. The remote test unit has a controller having a memory and a RF receiver for receiving the test signals, television signal test signals and telemetry signals transmitted over the CATV system. The remote test unit converts the telemetry signals to data which contains the list of frequencies to be swept during the next sweep cycle and the measured signal levels of the frequencies swept during the prior sweep cycle transmitted from the head end test unit which is stored in its controller's memory. The controller of the remote test unit causes the remote test unit to begin the next sweep cycle at the end of the telemetry cycle and during the sweep cycle the remote test unit measures the signal levels of the test signals and television signal test signals received by the RF receiver of the remote test unit and data indicative of the measured signal levels is input into and stored in memory of the remote test unit controller. Based on the measured signal levels received from the head end test unit and the signal levels the remote test unit measures, the remote test unit determines the frequency response of the CATV system and preferably outputs data indicative of the results, such as by displaying the results on a display.

Additional features and advantages of the invention will become apparent to those skilled in the art upon consideration of the following detailed description of preferred embodiments of the invention, exemplifying the best modes of carrying out the invention as presently perceived. The detailed description particularly refers to the accompanying figures in which:

DETAILED DESCRIPTION OF THE DRAWINGS

Figure 1:
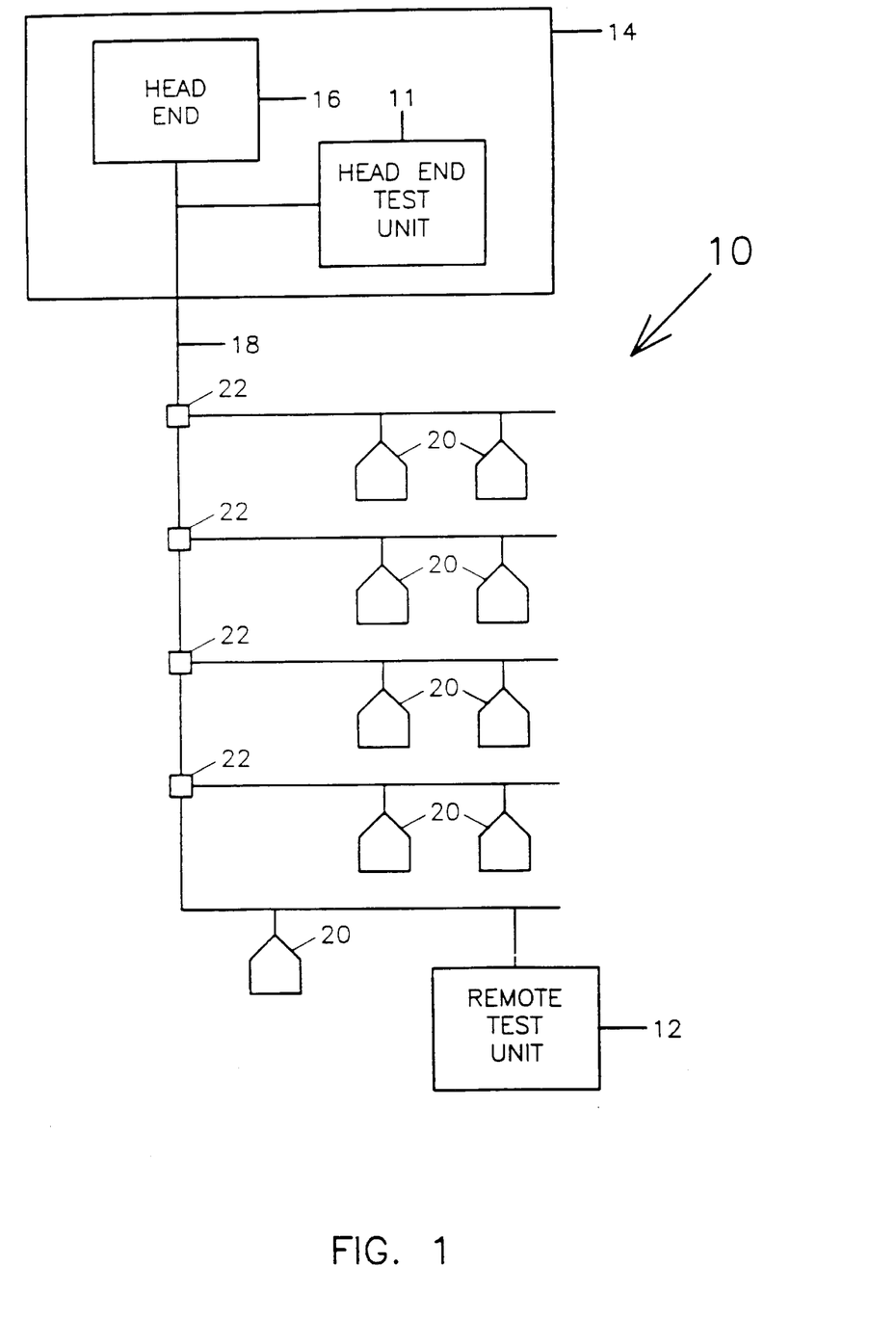
FIG. 1 is a block diagram representation of a CATV system having a frequency sweep test system coupled thereto.

FIG. 1 is a block diagram representation of a cable system 10 to which a head end test unit 11 and a remote test unit 12 are coupled. Cable system 10 includes a cable head end facility 14 at which a head end 16 of the cable system 10 is located. A coaxial cable 18 extends from head end 16 throughout the area served by cable system 10. Subscribers 20 are connected to coaxial cable 18 at multiple points along its run. Interspersed throughout the run of coaxial cable 18 are various elements, such as amplifiers 22, which are part of cable system 10.

As is conventional, head end 16 receives a plurality of television signals, such as from satellite receivers (not shown) and antennas located at the head end facility 14 and converts these television signals to appropriate frequencies for transmission over coaxial cable 18 to subscribers 20. In this regard, cable system 10 might be designed to handle forty channels. Each of the forty channels would have a unique frequency. Frequencies are adjacent each other and spaced from each other by a set amount, i.e., typically 6 MHz.

Figure 2:
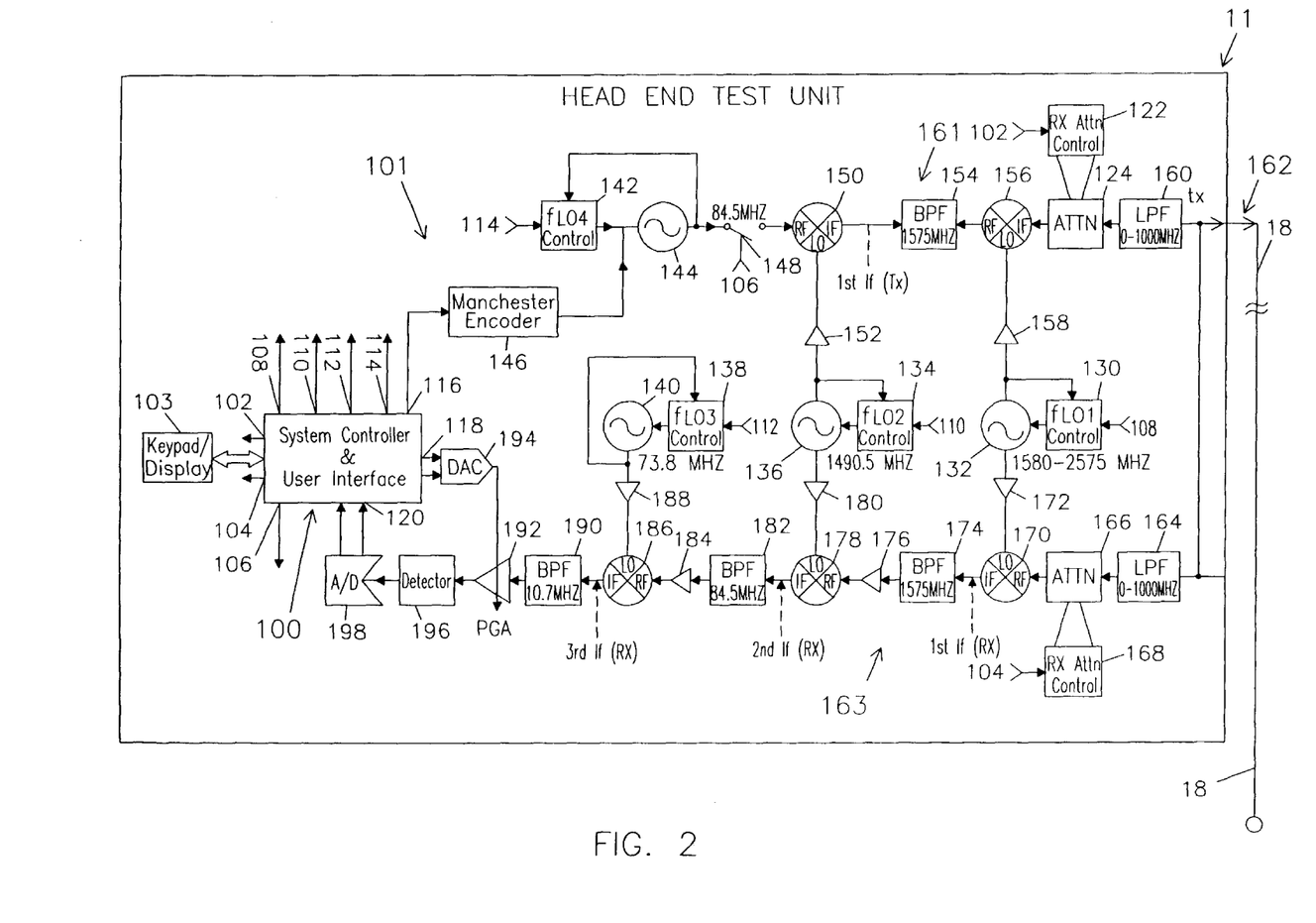
FIG. 2 is a block diagram of a head end test unit according to the invention.

Referring to FIG. 2, head end test unit 11 is shown in more detail in block diagram form. Head end test unit 11 includes a system controller and user interface 100 and a combined transmitter/receiver 101, as will be described in more detail below. System controller and user interface 100 has a transmitter attenuator control output 102, a receiver attenuator control output 104, a RF on/off control output 106, oscillator frequency control data outputs 108, 110, 112, 114, serial data output 116, data outputs 118, and data inputs 120. Illustratively, system controller and user interface 100 is a microcomputer with conventional associated circuitry, such as a MC68331 microcomputer manufactured by Motorola, Inc., Motorola, Microprocessor Product Group, 6501 William Cannon Drive West, Oakhill, Tex. 78735, and outputs 102, 104, 106, 108, 110, 112,114, 116, 118 and data inputs 120 are appropriate inputs and outputs of the microcomputer. A keypad/display 103 is illustratively coupled to appropriate data inputs/outputs of system controller and user interface 100.

Transmitter control output 102 is coupled to an attenuator controller 122 which in turn is coupled to an attenuator 124. RF on/off output 106 is coupled to RF on/off switch 148.

Oscillator frequency control data outputs 108 are coupled to a first oscillator controller 130 which in turn is coupled to a first voltage controlled oscillator 132. Oscillator frequency control data outputs 110 are coupled to a second oscillator controller 134 which in turn is coupled to a second voltage controlled oscillator 136. Oscillator frequency control data outputs 112 are coupled to a third oscillator controller 138 which in turn is coupled to a third voltage controlled oscillator 140. Oscillator frequency control data outputs 114 are coupled to a fourth oscillator controller 142 which in turn is coupled to a fourth voltage controlled oscillator 144. Illustratively, first oscillator controller 130 and first voltage controlled oscillator 132 comprise a programmable phase-lock-loop circuit (programmed via oscillator frequency control outputs 108 of system controller and user interface 100) as do second oscillator controller 134 and second voltage controlled oscillator 136 (programmed via oscillator frequency control outputs 110 of system controller and user interface 100), third oscillator controller 138 and third voltage controlled oscillator 140 (programmed via oscillator frequency control outputs 112 of system controller and user interface 100), and fourth oscillator controller 142 and fourth voltage controlled oscillator 144 (programmed via oscillator frequency control outputs 114 of system controller and user interface 100).

Serial data output 116 is coupled to an input of a manchester encoder 146. (Manchester encoder 146 is illustratively a HD3-6409-9 manufactured by Hitachi, America Ltd., Semiconductor/IC Sales and Service Div., 1800 Bering Drive, San Jose, Calif. 95112.) An output of manchester encoder 146 is coupled to an input of VCO 144. An output of VCO 144 is coupled through RF ON/OFF switch 148 to an RF input of a mixer 150. An output of second voltage controlled oscillator 136 is coupled through a buffer amplifier 152 to a local oscillator input of mixer 150. An IF output of mixer 150 is coupled through a 1575 MHz band pass filter 154 to a RF input of a mixer 156. An output of first voltage controlled oscillator 132 is coupled through a buffer amplifier 158 to a local oscillator input of mixer 156. An IF output of mixer 156 is coupled through attenuator 124 and a 0–1000 MHz low pass filter 160 to an RF output jack 162 to which is coupled coaxial cable 18. Low pass filter 160, attenuator 124, attenuator controller 122, mixer 156, buffer amplifier 158, voltage controlled oscillator 132, oscillator controller 130, band-pass filter 154, mixer 150, buffer amplifier 152, voltage controlled oscillator 136, oscillator controller 134, RF switch 148, voltage controlled oscillator 144 and oscillator controller 142 comprise an RF transmitter 161. As will be explained below, voltage controlled oscillators 132, 136 and their controllers also comprise part of a RF receiver 163. RF transmitter 161 and RF receiver 163 are part of combined RF transmitter/receiver 101.

Head end test unit 11 also includes a RF receiver 163 which includes a 0–1000 MHz low pass filter 164, attenuator 166, attenuator controller 168, mixer 170, buffer amplifier 172, 1575 MHz band-pass filter 174, buffer amplifier 176, mixer 178, buffer amplifier 180, 84.5 MHz band-pass filter 182, buffer amplifier 184, mixer 186, buffer amplifier 188, 10.7 MHz band-pass filter 190, programmable gain amplifier 192, digital to analog converter 194, detector 196, and analog to digital converter 198. RF jack 162 is coupled through 0–1000 MHz low pass filter 164 and attenuator 166 to a RF input of mixer 170. Attenuator controller 168 has an input coupled to receiver attenuator control output 104 of system controller and user interface 100 and an output coupled to attenuator 166.

Voltage controlled oscillator 132 has its output also coupled through buffer amplifier 172 to a local oscillator input of mixer 170. An IF output of mixer 170 is coupled through 1575 MHz band-pass filter 174 and buffer amplifier 176 to a RF input of mixer 178. Voltage controlled oscillator 136 has its output also coupled through buffer amplifier 180 to a local oscillator input of mixer 178. An IF output of mixer 178 is coupled through buffer amplifier 184 to a RF input of mixer 186.

Voltage controlled oscillator 140 has its output coupled through buffer amplifier 188 to a local oscillator input of mixer 186. An IF output of oscillator 186 is coupled through 10.7 MHz band-pass filter 190 to a signal input of programmable gain amplifier 192. A control input of programmable gain amplifier 192 is coupled to an output of digital to analog converter 194. Data inputs of digital to analog converter 194 are coupled to data bus outputs 118 of system controller and user interface 100.

An output of programmable gain amplifier 192 is coupled to an input of peak detector 196. An output of peek detector 196 is coupled to an input of analog to digital converter 198. Data outputs of analog to digital converter 198 are coupled to data inputs 120 of system controller and user interface 100.

Figure 3:
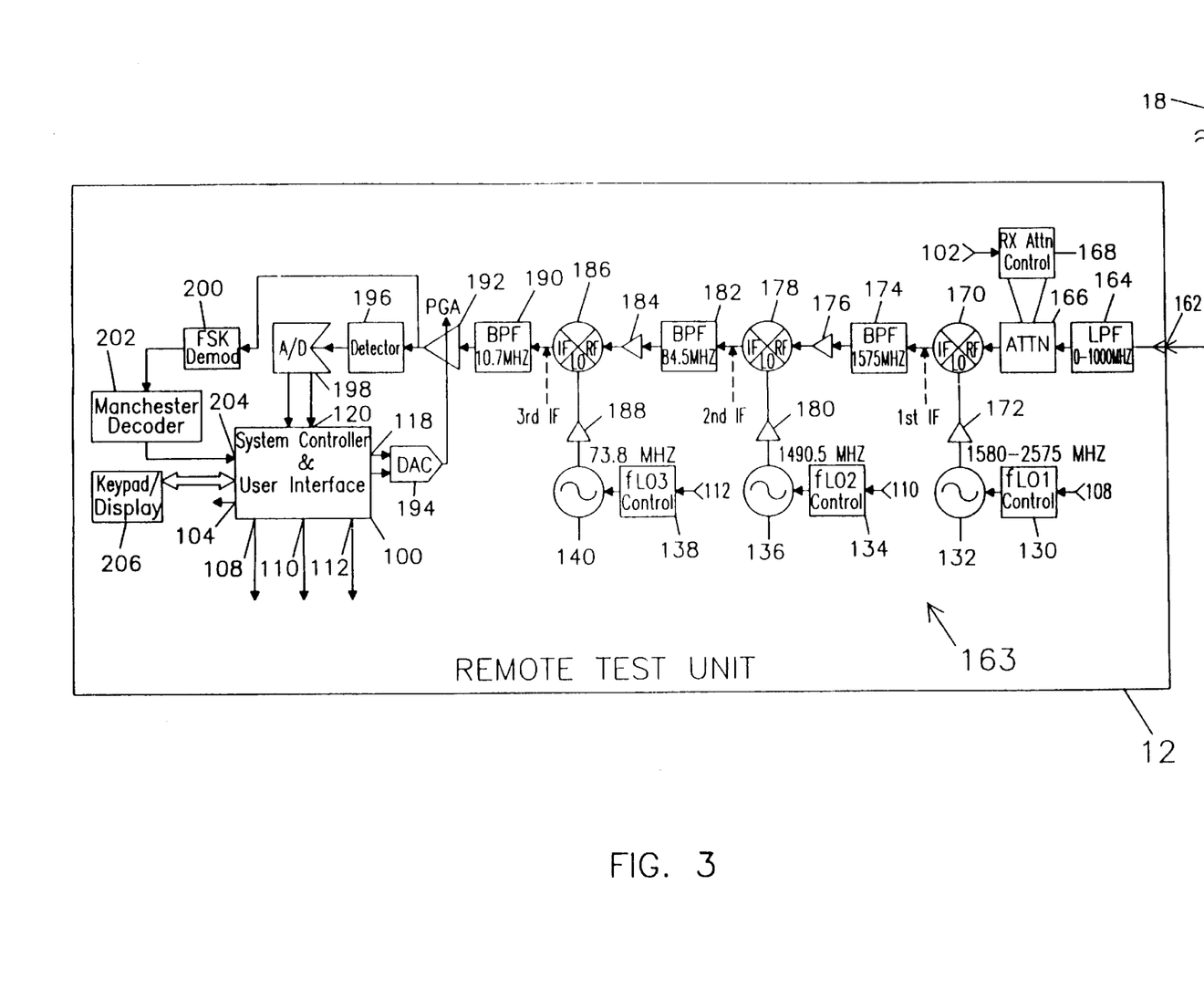
FIG. 3 is a block diagram of a remote test unit according to the invention.

Referring to FIG. 3, remote test unit 12 is shown in greater detail. Remote test unit 12 comprises a RF receiver which is identical to RF receiver 163 of head end test unit 11 except as described. Like elements between head end test unit 11 of FIG. 2 and remote test unit 12 of FIG. 3 are therefore identified with like reference numerals.

Remote test unit 12 includes, in addition to RF receiver 163, a FSK demodulator 200 having an input coupled to the output of programmable gain amplifier 192 and an output coupled to an input of manchester decoder 202. (Manchester decoder 202 is illustratively a HD3-64099.) An output of manchester decoder 202 is coupled to a serial data input 204 of system controller and user interface 100. Remote test unit 12 also includes a keypad/display 206 coupled to appropriate data inputs/outputs of system controller and user interface 100.

Head end test unit 11 utilizes a unique sweep insertion technique. The sweep signal and RF telemetry signals are both generated by RF transmitter 161 which has a sweep cycle wherein it is used for frequency response characterization and a telemetry cycle wherein it is used to transmit FSK data to the remote test unit 12.

Transmitter 161 and receiver 163 of head end test unit 11 operate in conjunction as a tracking type signal generator. That is, local oscillators used in RF receiver section 163 (voltage controlled oscillators 132, 136) are also used to generate the RF signals to be transmitted over coaxial cable 18 by head end test unit 11. In this regard, the transmit signal originates with voltage controlled oscillator 144 which is tuned to the same frequency, illustratively 84.5 MHz, as the second IF of RF receiver section 163. (The second IF of RF receiver section 163 is the IF output of mixer 178.)

During the telemetry cycle, the telemetry signals from system controller and user interface 100, encoded by manchester encoder 146, are inserted into the RF signal to be transmitted by RF transmitter 161 at voltage controlled oscillator 144. The signal generated by VCO 144 is mixed with the local oscillator signal generated by VCO 136 by mixer 150 which converts the signal generated by VCO 144 to the 1st IF frequency (illustratively 1575 MHz) of RF receiver 163. The 1575 MHz signal is then filtered by band-pass filter 154 and the filtered IF signal is mixed with the first local oscillator signal of RF receiver 163 which is generated by VCO 132. VCO 132 can be programmed by system controller and user interface 100 via oscillator controller 130 to any frequency between 1580 and 2575 MHz. The first local oscillator signal generated by VCO 132 is mixed with the first IF signal from mixer 150 (nominally, 1575 MHz) and the resultant signal (first local oscillator minus first IF) is a signal having a frequency between 5 MHz and 1000 MHz. This resultant signal is then attenuated by programmable attenuator 124, programmed by system controller and user interface 100 via attenuator controller 122, filtered by low pass filter 160, and transmitted onto coaxial cable 18 through RF jack 162. To provide a high degree of isolation when VCO 132 is being tuned, VCO 144 is turned off.

RF receiver 163 is a super heterodyne receiver. The signal from RF transmit section 161 is first filtered by low pass filter 164. The filtered signal is then passed through programmable attenuator 166 which is used to lower the signal level in the event that the received signal level is too high and is over driving RF receiver 163. The attenuated signal is then mixed by mixer 170 with the frequency to which the first local oscillator, VCO 132, is tuned, to generate the 1st IF of RF receiver 163 at the IF output of mixer 170, which is nominally 1575 MHz. The mixed signal is then filtered by band-pass filter 174 to remove any IF images and mixed by mixer 178 with the second local oscillator, VCO 136, of RF receiver section 163 to produce the second IF (nominally 84.5 MHz) of RF receiver 163 at the IF output of mixer 178. The second IF is filtered by band-pass filter 182 and mixed with the third local oscillator, VCO 140, of RF receiver section 163 by mixer 186 to produce the third IF (nominally 10.7 MHz) of RF receiver 163. The third IF of RF receiver section 163 is filtered by band-pass filter 190 and then passed through programmable gain amplifier 192 and the output of programmable gain amplifier 192 is rectified by detector 196. The output of detector 196 is digitized by analog to digital converter 198 and this digitized value is read by system controller and user interface 100. System controller and user interface 100 uses the digitized value it reads from analog to digital converter 198 to determine how much gain to program into programmable gain amplifier 196 via digital to analog converter 194 so as to provide a signal to analog to digital converter 198 having a sufficient magnitude so that accurate level measurements can be made.

RF receiver 163 of remote test unit 12 operates identically to RF receiver section 163 of head end test unit 11 so its operation will not be separately described. Remote test unit 12 further includes FSK demodulator 200 and manchester decoder 202 which are used to demodulate the FSK modulated telemetry signals and then decode them for subsequent input into system controller and user interface 100 of remote test unit 12.

Figure 4:
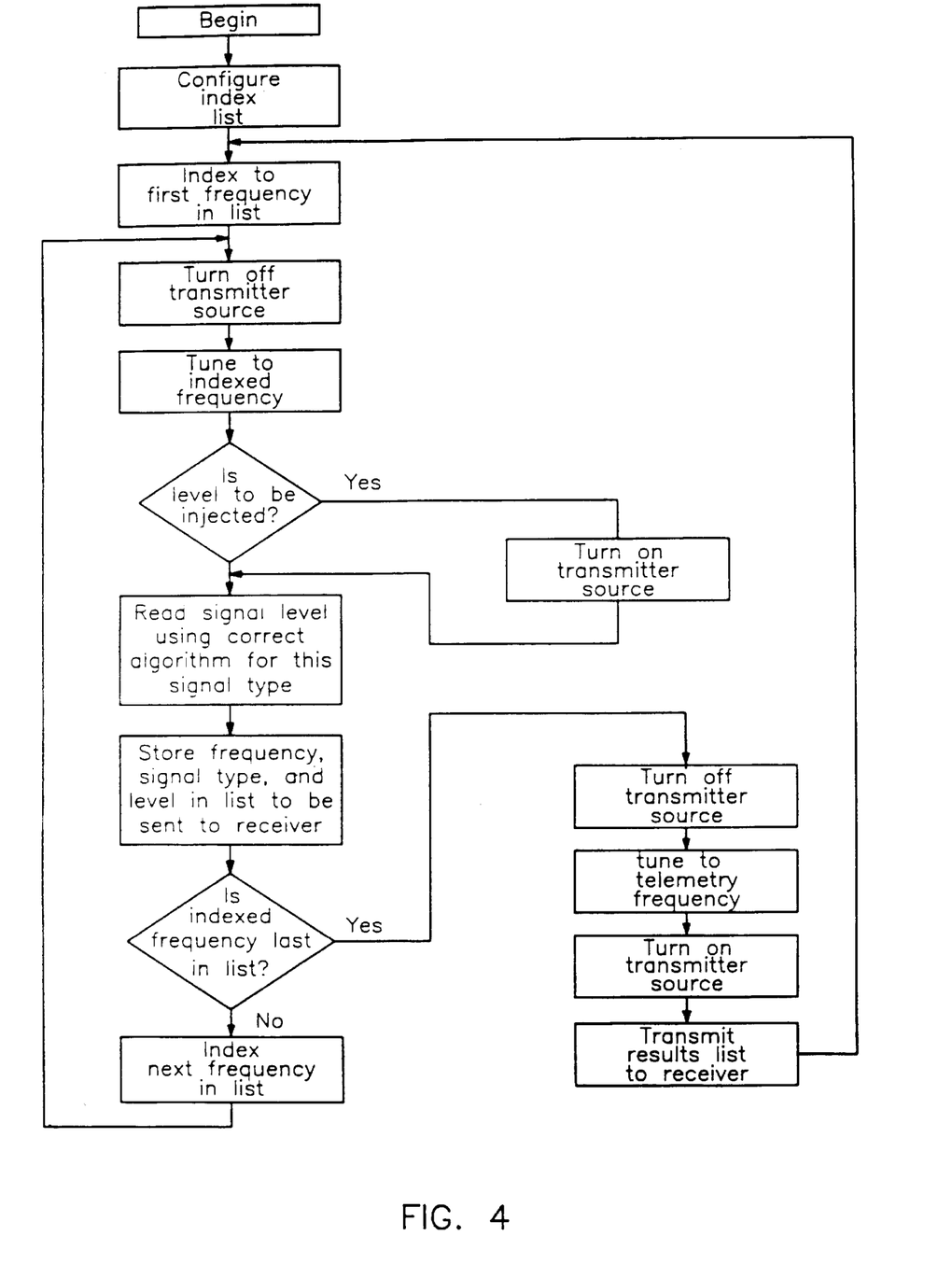
FIG. 4 is a flow chart showing the operation of the head end test unit of FIG. 2.
Figure 5:
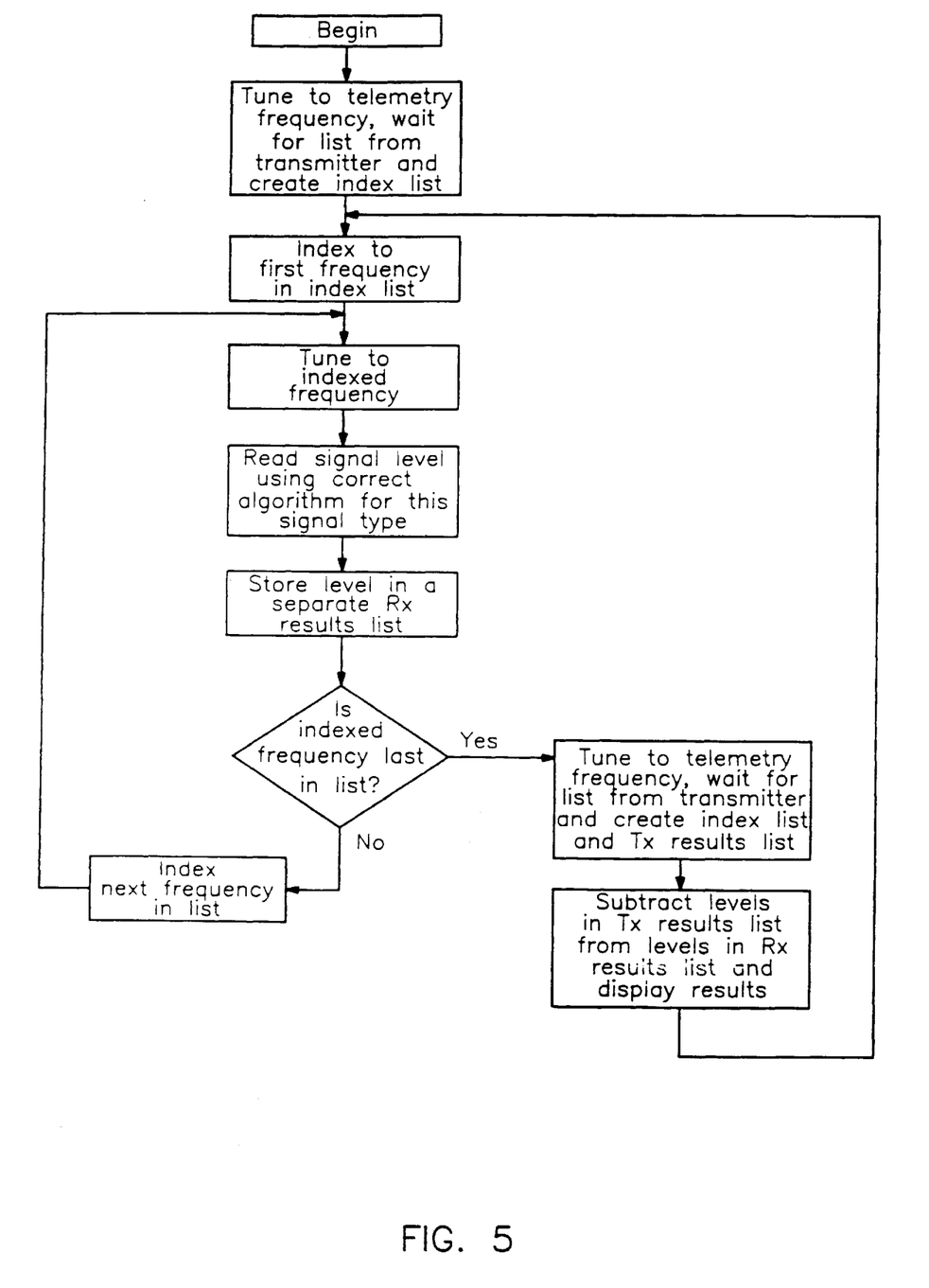
FIG. 5 is a flow chart showing the operation of the remote test unit of FIG. 3.

Referring to FIGS. 4 and 5, the operation of head end test unit 11 in conjunction with the operation of remote test unit 12 to perform a frequency sweep test of cable system 10 is described wherein FIG. 4 is a flow chart of a program for system controller and interface 100 of head end test unit 11 for the operation of head end test unit 11 and FIG. 5 is a flow chart of a program for system controller and interface 100 of remote test unit 12 for the operation of remote test unit 12. Referring to FIG. 4, when a technician or user first starts a frequency sweep test of cable system 160 the technician configures an index list in the memory of system controller and user interface 100 of head end test unit 11 by entering the list of frequencies to be included in the sweep and indication of whether each frequency is an "active" or "unused" frequency. The frequencies to be included in the sweep would typically be the frequencies for all the channels which cable system 10 can carry. As discussed above, an "active" frequency is one which is being used to transmit a television signal over coaxial cable 18 and an "unused" frequency is one which is not being used to transmit a television signal.

After the technician configures the index list, the technician initiates the frequency sweep test. Head end test unit 11 indexes to the first frequency m the index list and tunes RF transmitter 161 and RF receiver section 163 to that frequency. To do so, system controller and interface 100 opens RF switch 148 which effectively turns off RF transmitter 161. It then outputs the appropriate data on data outputs 108 which causes VCO controller 130 to tune VCO 132 to the desired frequency. The index list configured by the technician is then checked by system controller and user interface 100 to determine whether a test signal is to be generated at the desired frequency or if there is a television signal present at the desired frequency which is to be used as the test signal. If a television signal is present, system controller and user interface 100 leaves open switch 148 which effectively turns off RF transmitter 161. If a test signal is to be generated, system controller and user interface 100 closes RF switch 148 which effectively turns on RF transmitter 161 and the generated signal is transmitted onto coaxial cable 18 through RF jack 162.

In any event, regardless of whether a test signal is generated or a television signal is used as the test signal, head end test unit then measures the signal level of the test signal present on coaxial cable 18. To do so, system controller and user interface selects an appropriate algorithm for the signal type being used as a test signal. Illustratively, audio signals, video signals, pilot carriers (CW carriers) and digital carriers can be used as test signals and to optimize the measurement process, an algorithm for each type of test signal is programmed into system controller and user interface 100 and used for that particular type of test signal. It should be understood, however, that the use of different algorithms to measure different signal types is not part of the invention being claimed.

System controller and user interface 100 next stores the frequency, level and signal type of the test signal it just measured in a measurement list which will be subsequently sent to remote test unit 12. System controller and user interface 100 then checks to see if the indexed frequency was the last frequency in the index list. If it is not, system controller and interface 100 indexes to the next frequency in the index list and repeats the above steps.

If the indexed frequency is the last frequency in the index table list, system controller and user interface 100 opens RF switch 148, which effectively turns off RF transmitter 161, and then tunes RF transmitter section 161 to the telemetry frequency. Illustratively, the telemetry frequency is programmable with a default of 51 MHz. RF switch 148 is then closed. System controller and user interface then transmits the measurement list, i.e., frequencies of the test signals, measured levels of the test signals, and signal type, to remote test unit 12 by generating telemetry signals containing this information and transmitting the telemetry signals to remote test unit 12.

Referring to FIG. 5, the operation of remote test unit 12 is described. Remote test unit 12 receives the telemetry signals transmitted from head end test unit 11 and from these telemetry signals generates an index list of frequencies to be tested during the sweep, signal levels for each such frequency, and signal type, all of which is stored in the memory of system controller and user interface 100. Remote test unit 12 then indexes to the first frequency in the index list and tunes to the indexed frequency. To do so, system controller and interface 100 programs VCO 132 to the appropriate frequency. Remote test unit 12 then measures the signal level of he test signal at the indexed frequency. System controller and interface 100 selects the appropriate algorithm to use based on the signal type of the test signal and then reads the digitized signal level value from analog to digital converter 198. System controller and interface 100 stores the measured signal level in a separate results list.

System controller and interface 100 then checks the index table to see if the indexed frequency was the last frequency m the list. If it was not, system controller and interface 100 indexes to the next frequency in the list and repeats the above steps. If the indexed frequency was the last frequency in the index list, system controller and interface then tunes remote test unit 12 to the telemetry frequency and receives the next set of telemetry signals from head end test unit 11 which contain data indicative of the frequencies, signal levels, and signal type of the test signals measured by head end test unit 11 during the sweep cycle. Remote test unit 12 then creates a new index list of frequencies and also an associated results list for the signals measured by the head end test unit, which will be referred to as the head end or Tx results list, which includes the signal levels measured by the head end test unit at the index frequencies. System controller and interface 100 of remote test unit 12 now subtracts the signal levels stored in the head end results list from the signal levels stored in the remote unit results list for each frequency and thus determines the frequency response of cable system 10. Remote test unit 12 will illustratively output the results, such as by displaying the results in numerical or graphical form on keypad/display 206.

Although the invention has been described in detail with reference to certain preferred embodiments, materials and specific examples, variations and modifications exist within the scope and spirit of the invention as described and as defined in the following claims.

We claim:

1. An apparatus for frequency sweeping a CATV system, the CATV system having a plurality of channels, each channel corresponding to at least one of a plurality of channel frequencies, the plurality of channel frequencies including unused channel frequencies and used channel frequencies, the apparatus comprising:

a) an RF transmitter for generating and transmitting test signals at one or more of the plurality of the channel frequencies over the CATV system;

b) a processor coupled to the RF transmitter, the processor operable to index through a list of a plurality of channels to be swept, and cause the RF transmitter to generate and transmit a test signal at each unused channel frequency, and c) means for coupling the RF transmitter to the CATV system.

2. The apparatus of claim 1 wherein the RF transmitter further comprises:

a mixer having a local oscillator input and an output;

a voltage controlled oscillator connected to the local oscillator input, said voltage controlled oscillator operable to generate a local oscillator signal; and wherein the processor, for each test signal to be generated, operably controls the voltage controlled oscillator to cause the voltage controlled oscillator to generate the local oscillator signal at a select frequency corresponding to the channel frequency at which the test signal is to be generated.

3. The apparatus of claim 2 wherein the mixer further includes an IF input and wherein the mixer is operable to mix an IF signal provided at the IF input with the local oscillator signal provided at the local oscillator input in order to produce the test signal at the channel frequency.

4. The apparatus of claim 1 wherein the processor comprises a microprocessor and display unit.

5. The apparatus of claim 1 wherein the processor is further operable to cause the RF transmitter not to transmit a test signal for each used channel frequency.

6. An apparatus for frequency sweeping a CATV system, the CATV system having a plurality of channels, each channel corresponding to at least one of a plurality of channel frequencies, the plurality of channel frequencies including unused channel frequencies and used channel frequencies, the apparatus designed for use in conjunction with a receiving test unit, the apparatus comprising:

a) an RF transmitter for generating and transmitting test signals at one or more of the plurality of the channel frequencies over the CATV system;

b) a processor coupled to the RF transmitter, the processor operable to index through a list of a plurality of channels to be swept, and cause the RF transmitter to generate and transmit a test signal at each unused channel frequency, said test signal transmitted over the CATV system and received by the receiving test unit;

c) means for receiving each test signal generated by the RF transmitter and determining one or more characteristics of the test signal, and for generating data representative of the one or more characteristics to the processor; and d) means for providing a telemetry signal including the representative data to the receiving test unit in order to allow the receiving test unit to compare the one or more characteristics with the transmitted test signal.

7. The apparatus of claim 6 wherein said means for receiving each test signal and providing data includes an RF receiver operably coupled to the RF transmitter; and a level detector operably connected to the RF receiver, said level detector operable to generate a substantially DC voltage level indicative of a measure of signal strength of the received test signal;

an analog to digital converter connected to said level detector and the processor, the analog to digital converter operable to receive the substantially DC voltage level from the level detector and generate the representative data from the substantially DC voltage level.

8. The apparatus of claim 7 wherein said level detector comprises a peak detector.

9. The apparatus of claim 6 wherein the RF transmitter further includes:

a mixer having a local oscillator input and an output;

a voltage controlled oscillator connected to the local oscillator input, said voltage controlled oscillator operable to generate an a local oscillator signal; and wherein the processor, for each test signal to be generated, operably controls the voltage controlled oscillator to cause the voltage controlled oscillator to generate the local oscillator signal at a select frequency corresponding to the channel frequency at which the test signal is to be generated.

10. The apparatus of claim 9 wherein the means for receiving each test signal and generating representative data therefrom includes at least a first mixer, the first mixer being operably connected to the voltage controlled oscillator of the RF transmitter.

11. The apparatus of claim 6 wherein the RF transmitter further includes at least one oscillator, the means for receiving each test signal and generating representative data therefrom further includes said at least one oscillator, said at least one oscillator being shared with the RF transmitter.

12. The apparatus of claim 6 wherein the means for providing the telemetry signal to the receiving test unit comprises the RF transmitter and means for modulating the telemetry signal onto an RF signal generated by the RF transmitter.

13. The apparatus of claim 12 wherein the means for modulating includes a Manchester encoder operably connected between the processor and the RF transmitter.

14. The apparatus of claim 6 wherein the processor is further operable to cause the RF transmitter not to transmit a test signal for each used channel frequency.

15. The apparatus of claim 14 wherein the means for receiving each test signal and generating representative data therefrom is further operable to:

receive a television signal on each used channel frequency;

generate data representative of one or more characteristics of the television signal; and provide the representative data to the processor.

16. A An apparatus for frequency sweeping a CATV system, the CATV system having a plurality of channels, each channel corresponding to at least one of a plurality of channel frequencies, the plurality of channel frequencies including unused channel frequencies and used channel frequencies, the apparatus designed for use in conjunction with a receiving test unit, the apparatus comprising:

a) an RF transmitter for generating and transmitting test signals at one or more of the plurality of the channel frequencies over the CATV system to the receiving test unit, and for transmitting telemetry signals over the CATV system to the receiving test unit;

b) a controller coupled to the RF transmitter, the controller operable to index through a list of a plurality of channels to be swept, cause the RF transmitter to generate and transmit a test signal on a plurality of channel frequencies, said test signal transmitted over the CATV system and received by the receiving test unit, and cause the RF transmitter to transmit a telemetry signal to the receiving test unit, said telemetry signal including information pertaining to transmitted test signals.

17. The apparatus of claim 16 further comprising:
   c) means for receiving each test signal generated by the RF transmitter and determining one or more characteristics of the test signal; and
   d) means for generating the telemetry signal using the one or more characteristics of the test signal.

18. The apparatus of claim 16 wherein the processor is further operable to cause the RF transmitter to generate and transmit a test signal only on each unused channel frequency.

19. The apparatus of claim 18 wherein the processor is further operable to cause the RF transmitter not to transmit a test signal at each used channel frequency.

20. The apparatus of claim 19 wherein the processor is further operable to cause the RF transmitter to transmit a telemetry signal to the receiving test unit, the telemetry signal including information pertaining to existing signals on the used channel frequencies.

21. The apparatus of claim 16 wherein the controller comprises a microprocessor.

* * * * *